United States Patent
Zuck et al.

(10) Patent No.: US 8,132,639 B2
(45) Date of Patent: Mar. 13, 2012

(54) NOZZLE ACTUATED SYSTEM FOR DISABLING A VEHICLE

(75) Inventors: James C. Zuck, Marshall, MI (US); Frederick W. Blanchard, Battle Creek, MI (US); Aaron Zuck, Homer, MI (US)

(73) Assignee: Marshall Excelsior Company, Marshall, MI (US)

( * ) Notice: Subject to any disclaimer, the term of this patent is extended or adjusted under 35 U.S.C. 154(b) by 89 days.

(21) Appl. No.: 12/752,662

(22) Filed: Apr. 1, 2010

(65) Prior Publication Data

US 2010/0252349 A1    Oct. 7, 2010

Related U.S. Application Data

(60) Provisional application No. 61/166,081, filed on Apr. 2, 2009.

(51) Int. Cl.
*B60K 28/00*    (2006.01)
(52) U.S. Cl. .................................. 180/271; 141/346
(58) Field of Classification Search .................. 180/271; 141/207, 192, 94, 346
See application file for complete search history.

(56) References Cited

U.S. PATENT DOCUMENTS

| | | |
|---|---|---|
| 2,179,704 A | 11/1939 | Schjolin |
| 2,847,023 A | 8/1958 | Hansen et al. |
| 2,871,872 A | 2/1959 | Rowles |
| 3,026,004 A | 3/1962 | Rowell |
| 3,119,406 A | 1/1964 | Hartung |
| 3,172,576 A | 3/1965 | Hartung |
| 3,549,207 A | 12/1970 | Hayes |
| 3,572,305 A | 3/1971 | Moragne |
| 3,612,619 A | 10/1971 | Hayes |
| 4,024,897 A | 5/1977 | Hall |
| 4,076,326 A | 2/1978 | D'Angelo |
| 4,091,848 A | 5/1978 | Phillips |
| 4,135,596 A | 1/1979 | Silba |
| 4,442,915 A | 4/1984 | Steel |
| 4,469,149 A | 9/1984 | Walkey et al. |
| 4,583,072 A | 4/1986 | Matsushita |
| 4,753,488 A | 6/1988 | Whiteman et al. |
| 5,204,819 A | 4/1993 | Ryan |
| 5,329,164 A | 7/1994 | Saito |
| 5,359,522 A | 10/1994 | Ryan |
| 5,451,927 A | 9/1995 | Thompson |
| 5,635,770 A | 6/1997 | Evans, Jr. et al. |
| 5,700,999 A | 12/1997 | Streicher et al. |
| 5,720,327 A | 2/1998 | Foster, Jr. |
| 5,729,002 A | 3/1998 | Samples |

(Continued)

FOREIGN PATENT DOCUMENTS

WO    2008017756 A2    2/2008

*Primary Examiner* — Drew Brown
(74) *Attorney, Agent, or Firm* — Howard & Howard Attorneys PLLC (57) ABSTRACT

A system for disabling a vehicle carrying a substance in a storage tank includes a holster defining a cavity for receiving a nozzle in fluidic connection to the storage tank when not in use. The holster includes a main body and a bracket. The bracket is affixable to the vehicle and engagable with the main body at a plurality of positions along the main body. The system further includes a sensor for sensing whether the nozzle is received in the holster. The sensor is also in communication with at least one drive element of the vehicle to disable the at least one drive element when the nozzle is not received within the holster.

20 Claims, 8 Drawing Sheets

U.S. PATENT DOCUMENTS

| | | |
|---|---|---|
| 6,011,484 A | 1/2000 | Dietl et al. |
| 6,021,823 A | 2/2000 | Hale |
| 6,712,171 B2 | 3/2004 | Farmer |
| 6,825,760 B2 | 11/2004 | Sawyer et al. |
| 7,051,831 B2 | 5/2006 | Scholer et al. |
| 7,171,989 B2 | 2/2007 | Corless et al. |
| 7,195,093 B1 | 3/2007 | Ahmadi |
| 7,322,337 B1 | 1/2008 | Brister et al. |
| 7,322,338 B1 | 1/2008 | Brister et al. |
| 7,412,994 B2 * | 8/2008 | Corless et al. .......... 141/198 |
| 7,671,482 B2 * | 3/2010 | Tighe .................... 307/9.1 |
| 7,806,456 B1 * | 10/2010 | Zandparsa ............ 296/97.22 |
| 2003/0102976 A1 | 6/2003 | Lavallee |

* cited by examiner

NOZZLE ACTUATED SYSTEM FOR DISABLING A VEHICLE

CROSS REFERENCE TO RELATED APPLICATION

This application claims the benefit of provisional patent application No. 61/166,081, filed Apr. 2, 2009, which is hereby incorporated by reference.

BACKGROUND OF THE INVENTION

1. Field of the Invention

The subject invention relates generally to a vehicle disabling system and specifically to a system for disabling a material handling vehicle that is actuated by placement of a nozzle.

2. Description of the Related Art

A material handling vehicle generally has a length of hose coupled to a dispensing tank for dispersing a material, such as a fuel, from the dispensing tank to a holding tank. The hose typically includes a nozzle such that cooperates with the holding tank to pass the fuel from the dispensing tank to the holding tank. The fuel hose is secured to the material handling vehicle after the fuel is transferred from the dispensing tank to the holding tank. Generally, the fuel hose is wound on a reel located on the vehicle during transit.

The material handling vehicle should be manually disabled during the fueling process to prevent the material handling vehicle from traversing away from the holding tank while the fuel hose is still connected. Generally, an operator of the material handling vehicle manually shifts the transmission of the vehicle to a parked condition and applies an emergency parking brake thereby disabling the vehicle. However, operators commonly fail to complete each of the abovementioned steps to safely render the material handling vehicle inoperable during material transfer. In one instance, the operator traverses away from the holding tank before disconnecting the fuel hose from the holding tank, thereby causing damage to the dispensing tank, the fuel hose and the holding tank. In another instance, the operator traverses away without securing the fuel hose to the reel.

The prior art suggests a variety of devices for rendering a material handing vehicle inoperable. Unfortunately, these prior art devices are often suited only for use with certain vehicles, thus limiting their broad application. Furthermore, these prior art devices may require a large number of moving parts required for operation and/or extensive modification to the vehicle. Moreover, these devices often significantly extend the duration in which a material transfer operation takes place.

Accordingly, it would be advantageous to manufacture a disabling system that requires minimal modification to and integration with existing components of the material handling vehicle. Furthermore, it would be advantageous to develop a disabling system that can cooperate with one or more vehicle systems depending on application.

BRIEF SUMMARY

A system for disabling a vehicle is disclosed herein, wherein the vehicle carries a storage tank for holding a substance and a nozzle is connectable to a hose in fluidic communication with the storage tank. The system includes a holster defining a cavity for receiving the nozzle when not in use. The holster includes a main body and a bracket. The bracket is affixable to the vehicle and engagable with the main body at a plurality of positions along the main body. The system further includes a sensor for sensing whether the nozzle is received in the holster. The sensor is also in communication with at least one drive element of the vehicle to disable at least one drive element when the nozzle is not received within the holster.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the Figures, wherein like numerals indicate like parts throughout the several views, a system 20 for disabling a vehicle V carrying a storage tank S is shown herein.

The storage tank S is utilized for holding a substance. The substance may be a flammable liquid or gas, such as, but not limited to, propane, liquefied petroleum gas, gasoline (petrol), petroleum, ethanol, methanol, diesel, hydrogen, kerosene, and jet fuel. The substance may also be a non-flammable liquid or gas, such as, but not limited to, water, compressed air, milk, and vegetable oil. Furthermore, the substance may be a solid, especially a solid in granular form, such as, but not limited to, grains. Moreover, those skilled in the art realize other substances that may be held in the storage tank S in accordance with the subject invention. In the illustrated embodiment, the substance held in the storage tank S is not used to propel the vehicle V, but is instead being merely transported by the vehicle V. A hose H is in fluidic communication with the storage tank S for transporting the substance therethrough.

Figure 1:
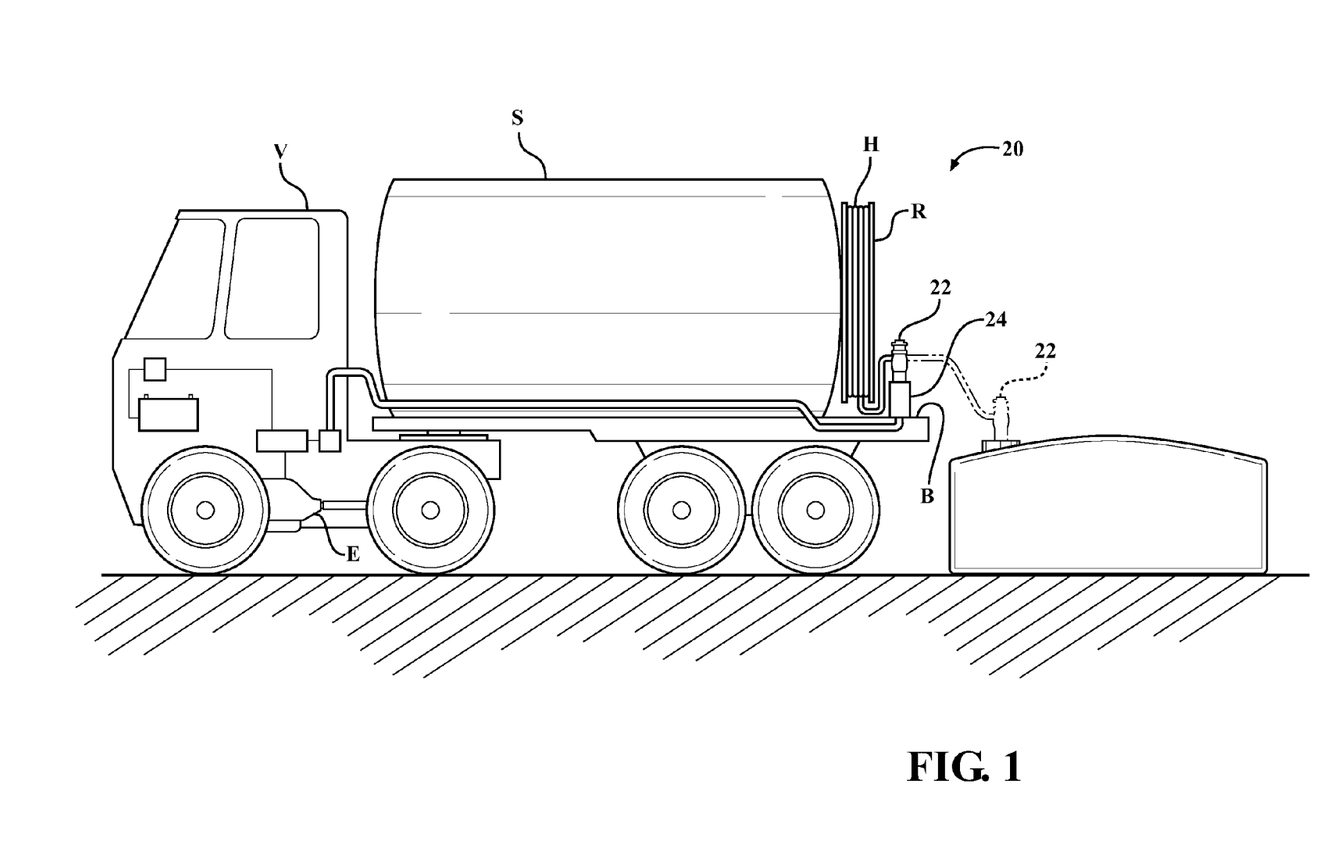
FIG. 1 is a side view of a system for disabling a vehicle carrying a storage tank.

In the illustrated embodiment, as shown in FIG. 1, the system 20 includes a nozzle 22 connectable to the hose H, such that, when connected, the nozzle is in fluidic communication with the hose H. As such, the nozzle 22 is also in fluidic communication with the storage tank S such that the substance stored in the storage tank S may be discharged through the nozzle 22. Conversely, the nozzle 22 may be used to transfer the substance into the storage tank S. The hose H may be wound around a reel R when in transport and unwound as necessary for transfer of the substance. However, those skilled in the art realize that the system 20 described herein may be utilized without the nozzle 22 of the illustrated embodiment.

Figure 2:
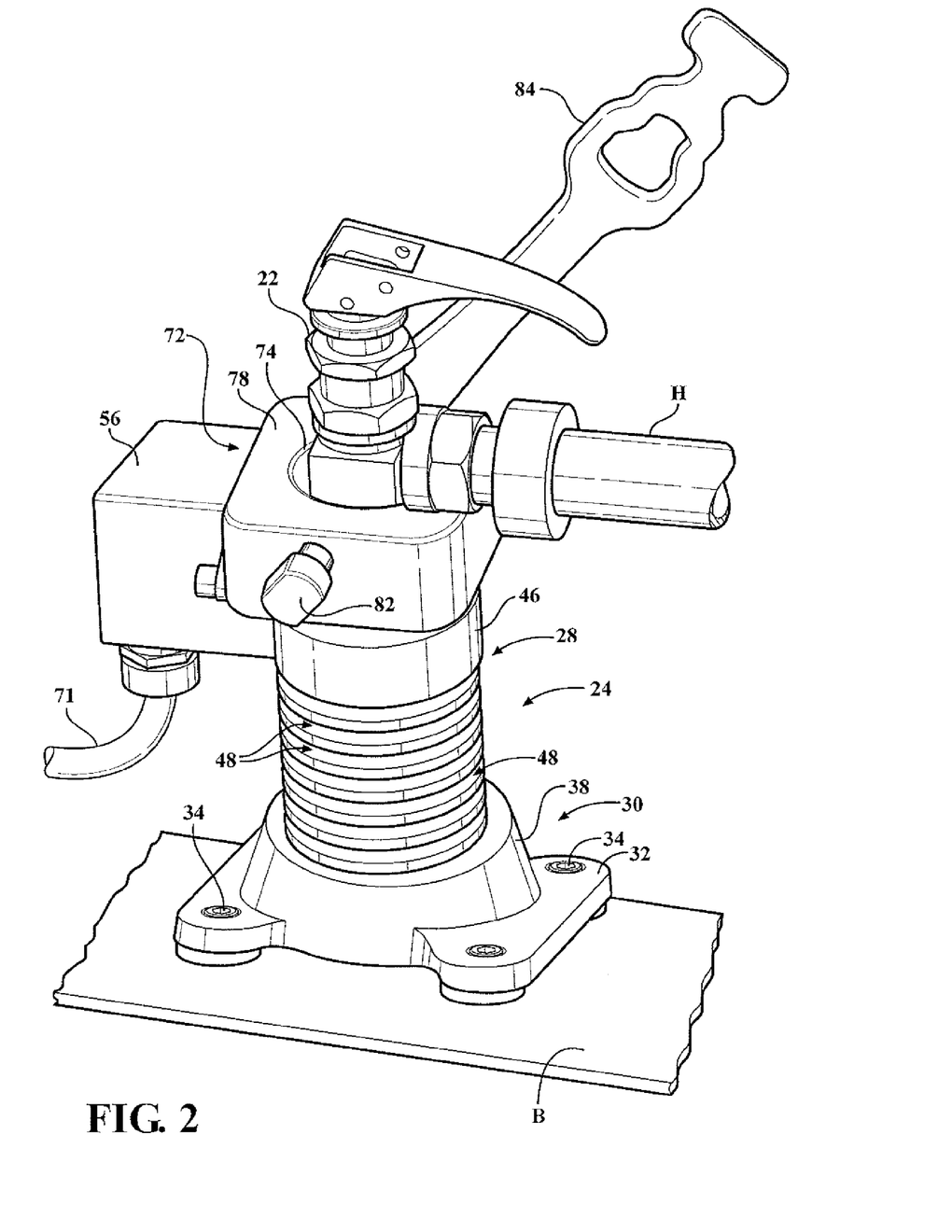
FIG. 2 is a perspective view of a holster of the system showing a nozzle received within the holster with a main body of the holster disposed at one position with respect to a bracket attached to the vehicle.
Figure 3:
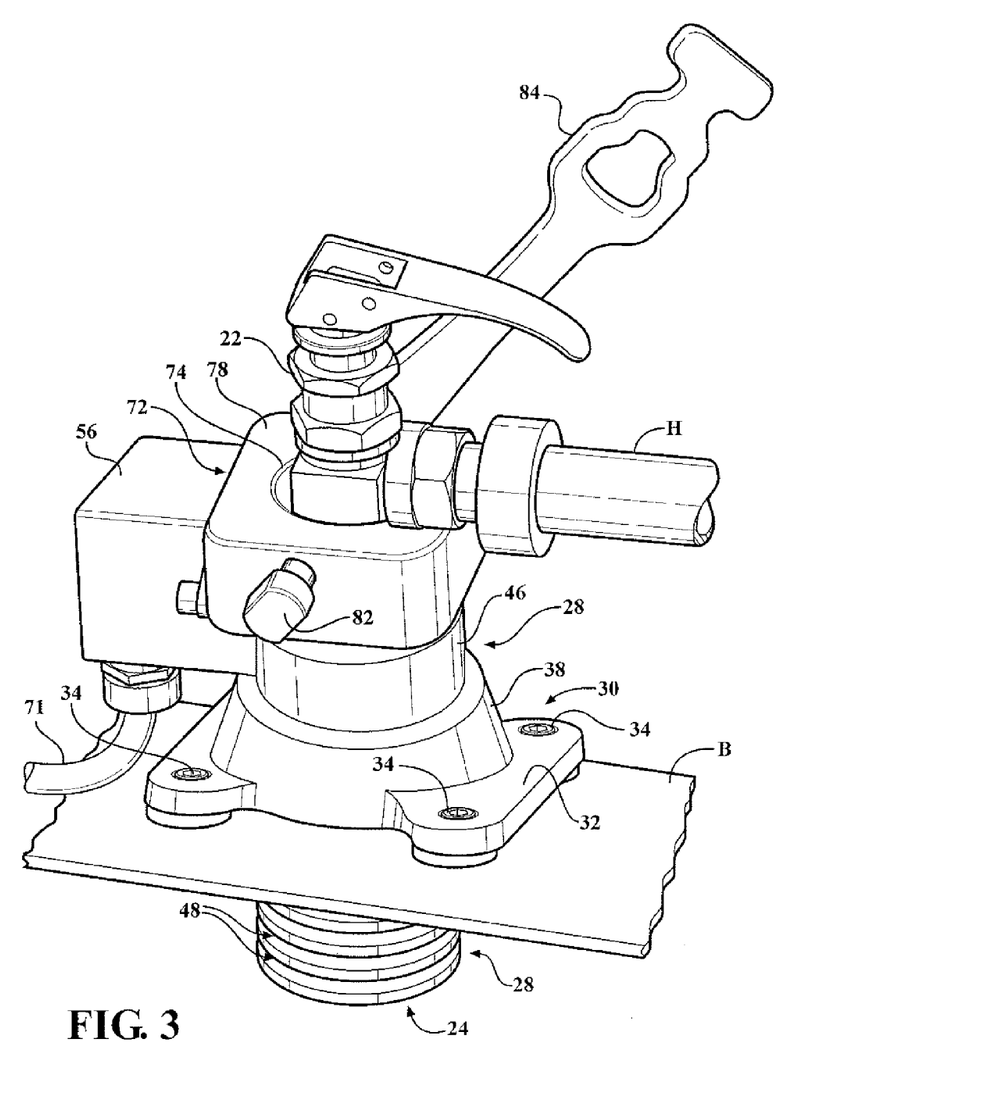
FIG. 3 is a perspective view of the holster showing a nozzle received within the holster with a main body of the holster disposed at another position with respect to the bracket.
Figure 4:
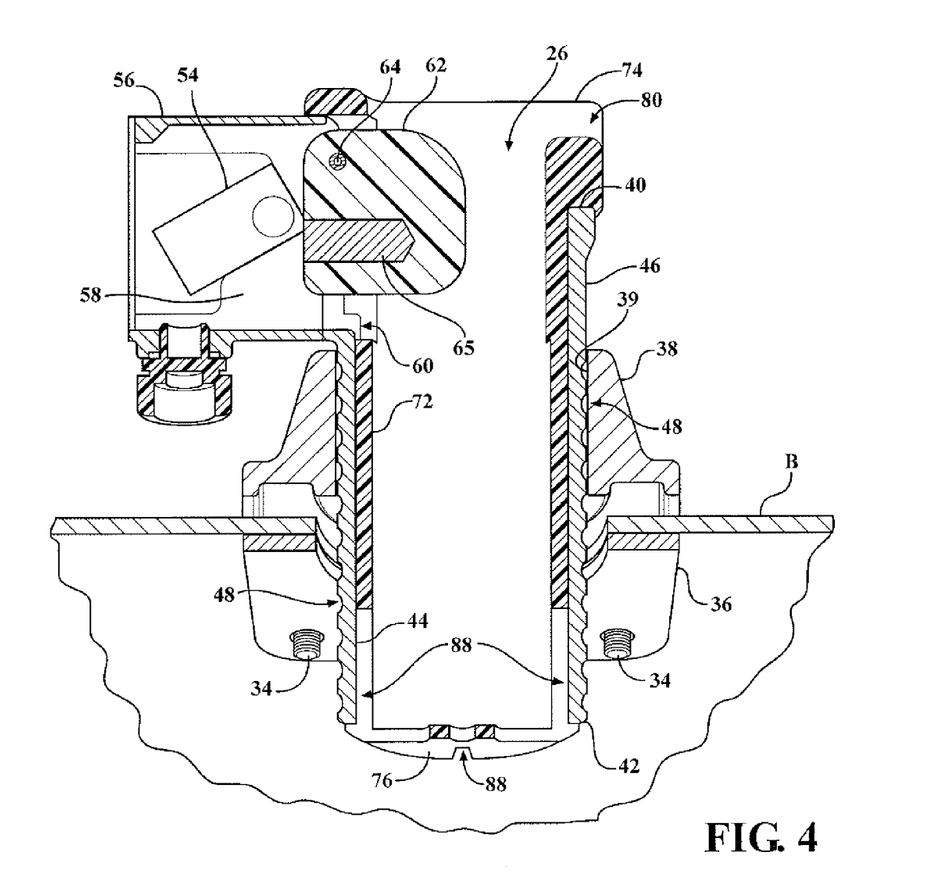
FIG. 4 is a cross sectional view of the holster showing a sensor block in a first position for disabling the vehicle when the nozzle is not received by the holster.
Figure 5:
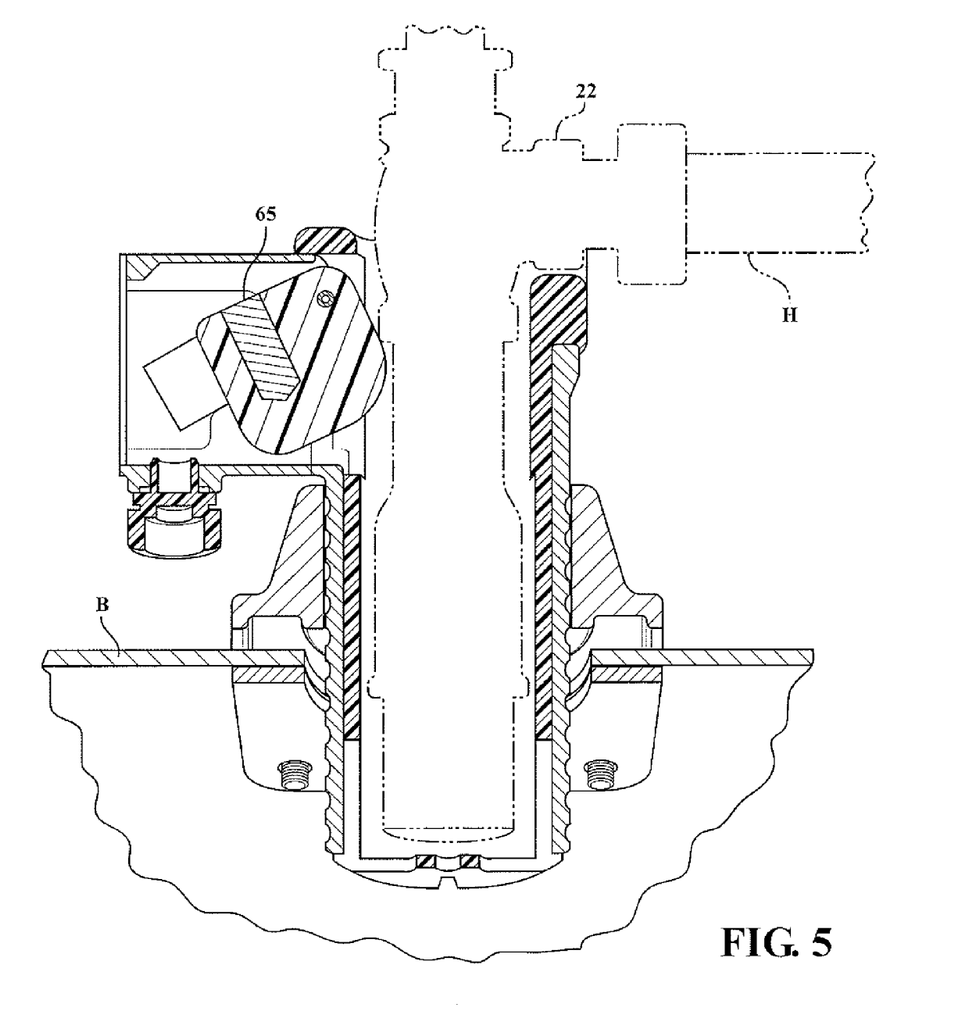
FIG. 5 is a cross sectional view of the holster showing the sensor block in a second position for enabling operation of the vehicle when the nozzle is received by the holster.

The system 20 includes a holster 24 for receiving the nozzle 22 when the nozzle 22 is not in use, as can be seen in FIGS. 2 and 3. More specifically, the holster 24 defines a cavity 26, as can be seen in FIGS. 4 and 5, for receiving the nozzle 22. Referring to FIGS. 2-5, the holster 24 of the illustrated embodiment includes a main body 28 (which defines the cavity 26) and a bracket 30. The main body 28 and bracket 30, in the illustrated embodiment, are composed of metal for rigidity and durability, and are painted to prevent corrosion. However, those skilled in the art realize that other suitable materials, e.g., plastics, may be utilized to form the main body 28 and bracket 30.

In the illustrated embodiment, the vehicle V includes a base B having a generally planar configuration. The bracket 30 is affixable to the vehicle V. Specifically, in the illustrated embodiment, the bracket 30 is shown affixed to the generally planar base B. However, those skilled in the art realize that the bracket 30 may be suitably affixed to other portions of the vehicle V as necessary. The bracket 30 of the illustrated embodiment includes a flange portion 32 defining a substantially flat surface (not numbered) and defining a plurality of holes (not numbered). As shown in FIGS. 4 and 5, a plurality of bolts 34 are disposed through the holes in the flange portion 32 and holes (not numbered) in the base B. The bolts 34 engage with a plate 36 disposed adjacent the base B and opposite the bracket 30. Of course, other techniques may be utilized to affix the bracket 30 to the vehicle V, including, but not limited to, screws (not shown) and welding.

The bracket 30 is engagable with the main body 28. As such, the bracket 30 of the illustrated embodiment includes an engagement portion 38 extending from the flange portion 32 and having an interior surface 39. The interior surface 39 is engagable with the main body 28 of the holster 24. As such, when the main body 28 is secured to the bracket 30 and the bracket 30 is affixed to the vehicle V, the main body 28 is also secured to the vehicle V.

The bracket 30 is engagable with the main body 28 at a plurality of positions along the main body 28. As such, the position of the main body 28, and the positioning of the holster 24 itself, may be configured and/or adjusted based on the specific configuration of the vehicle V. This can be readily appreciated by comparing FIG. 2 to FIG. 3, where the main body 28 is in a different position in the respective figures. As such, the system 20 may be be implemented in a wide variety of vehicles V having different geometrical and spatial configurations.

In the illustrated embodiment, the main body 28 has a generally cylindrical shape that extends between a top end 40 and a bottom end 42. That is, the main body 28 resembles a shaft and has a generally circular cross section. The main body 28 also has an inner surface 44 disposed adjacent the cavity 26 and an outer surface 46 opposite the cavity 26.

The outer surface 46 of the main body 28 in the illustrated embodiment defines a plurality of recesses 48 spaced from one another. The recesses 48 are annular, or ring like, and extend completely around the outer surface 46 such that the main body 28 may be secured in any rotational position. This allows a large amount of flexibility for accommodating different vehicle V designs. However, in another embodiment, the plurality of recesses 48 may not be ring shaped, i.e., the recesses 48 may not extend completely around the outer surface 46 to limit the rotational position of the main body 28. Furthermore, in yet another embodiment, the outer surface 46 may define a single recess (not numbered) in a spiral fashion.

In the illustrated embodiment, the engagement portion 38 of the bracket 30 defines at least one hole (not numbered). The hole passes through the interior surface 39. More specifically, two holes are disposed through the interior surface 39 in the illustrated embodiment. Each hole accommodates a bolt 50. The bolt 50 cooperates with at least one of the recesses 48 of the outer surface 46 of the main body 28 for securing the main body 28 to the bracket 24 at one of the plurality of positions.

The bracket 30 of the illustrated embodiment also defines a gap 52 defined through the engagement portion 38. The at least one hole is positioned such that the bolt 50 traverses the gap 52. When the bolt 50 is tightened, a width of the gap 52 is reduced, thus allowing the engagement portion 38 of the bracket 30 to further engage with the outer surface 46 of the main body to assist in securing the main body 28 to the bracket 24.

The system 20 further includes a sensor 54 for sensing whether or not the nozzle 22 is received in the holster 24. The system 20 prevents movement of the vehicle V when the nozzle 22 is not properly disposed in the holster 24, as described in greater detail below. This prevents the vehicle V from being accidently moved when the nozzle 22 is being used to transfer the substance. In the illustrated embodiment, the sensor 54 is an inductive proximity sensor that senses non-ferrous metals, such as model number BI5U-Q08-AP6X2, manufactured by Hans Turck GmbH & Co. KG of Mülheim an der Ruhr, Germany. Of course, other suitable sensors will be realized by those skilled in the art.

The system 20 of the illustrated embodiment includes a sensor housing 56 for supporting and enclosing the sensor 54. The sensor housing 56 has walls (not separately numbered) defining an inner chamber 58. The sensor 54 is disposed within the inner chamber 58 and attached to at least one of the walls.

In the illustrated embodiment, the main body 28 defines an opening 60, best seen in FIGS. 4 and 5, which extends through the inner and outer surfaces 44, 46. The sensor housing 56 is disposed adjacent the outer surface 46 of the main body 28 and at least partially encloses the opening 60. Specifically, in the illustrated embodiment, the opening 60 is generally rectangular shaped and the sensor housing 56 covers the entire opening 60.

A sensor block 62 is operatively connected to the sensor housing 56 and is movable between a first position and a second position. In the first position, as shown in FIG. 4, the sensor block 62 is disposed substantially within the cavity 26 of the holster 24. In the second position, the sensor block 62 is disposed substantially within the inner chamber 58 of the sensor housing 56 such that the sensor 54 senses the proximity of the sensor block 62 when in the second position. The sensor block 62 is hingibly connected to the sensor housing 56 with a pin 64 disposed through a hole (not numbered) in the sensor block 62. A spring (not shown) connects the sensor block 62 to the sensor housing 56 and biases the sensor block 62 towards the first position.

In the illustrated embodiment, the sensor block 62 is formed of plastic, which is a non-conductive material. A conductive insert 65 is disposed within the sensor block 62. More specifically, the conductive insert 65 is incased within the plastic of the sensor block 62. The conductive insert 65 is formed of a conductive material, such as metal, to trigger actuation of the sensor 54 when the sensor block 62 is in the second position. By encasing the conductive insert 65 in the sensor block 62, the conductive insert 65 is generally protected from corrosion while providing a positive sensing material for the sensor 54.

Insertion of the nozzle 22 into the holster 24 actuates movement of the sensor block 62 from the first position to the second position, as can be seen in FIG. 5. Therefore, by sensing the proximity of the sensor block 62, the sensor 54 is also sensing that the nozzle 22 is received within the holster 24.

Figure 10:
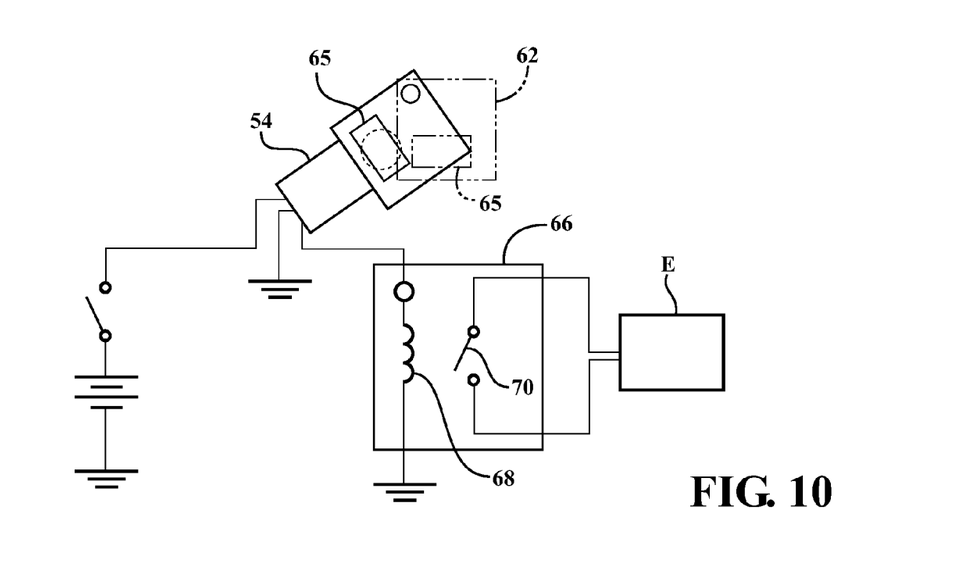
FIG. 10 is a block electrical schematic of a sensor in communication with a switch for disabling the vehicle.

Referring to FIG. 10, the system 20 of the illustrated embodiment also includes a switch 66 in communication with the sensor 54. The switch 66 is connectable to at least one drive element E of the vehicle V to disable the at least one drive element E of the vehicle V when the nozzle 22 is not received within the holster 24.

In the illustrated embodiment, the switch 66 is implemented as an electromechanical relay (not separately numbered) electrically connected to the sensor 54. Of course, solid state relays, transistors, or other devices may alternatively be utilized to implement the switch 66 as are well known to those skilled in the art. The electromechanical relay of the illustrated embodiment includes a coil 68 and at least one normally open contact 70. When the coil 68 is energized, the normally open contact 70 closes to allow electric current to flow, i.e., provides a logical "1" signal. When the coil 68 is not energized, the contact 70 is open and prevents electric current from flowing, i.e., provides a logical "0" signal.

The drive element E of the vehicle V may be any of the mechanisms used to propel the vehicle, including, but not limited to, an engine, a transmission, brakes, a transmission shifting device, an engine controller, and a vehicle controller. In the illustrated embodiment, the normally open contact 70 of the switch 66 is electrically connected to the transmission shifting device (not separately numbered). When the switch is open, i.e., when the nozzle 22 is not disposed within the holster 24, the transmission switching device maintains the transmission in a "park" position in response to the logical "0" signal, and will not allow transfer to any other position or gear (e.g., "drive" or "neutral"). When the switch is closed, i.e., when the nozzle 22 is received within the holster 24, the transmission switching device allows the transmission to be switched to any position in a normal operating fashion in response to the logical "1" signal.

In the illustrated embodiment, the switch 66 is disposed remote from the holster 24 and the sensor 54. For instance, the switch 66 may be disposed in an engine compartment (not labeled) of the vehicle V. As such, in the illustrated embodiment, a cable 71 electrically connects the switch 66 to the sensor 54. However, those skilled in the art realize that the switch 66 may alternatively be disposed adjacent to or within the sensor housing 56.

The holster 24 of the illustrated embodiment also includes a sleeve 72 disposed within the cavity 26 for preventing the nozzle 22 from directly contacting the main body 28. The sleeve 72 extends between a top 74 and a bottom 76 and, in cooperation with the main body 28, defines the cavity 26 for accommodating the nozzle 22.

Figure 6:
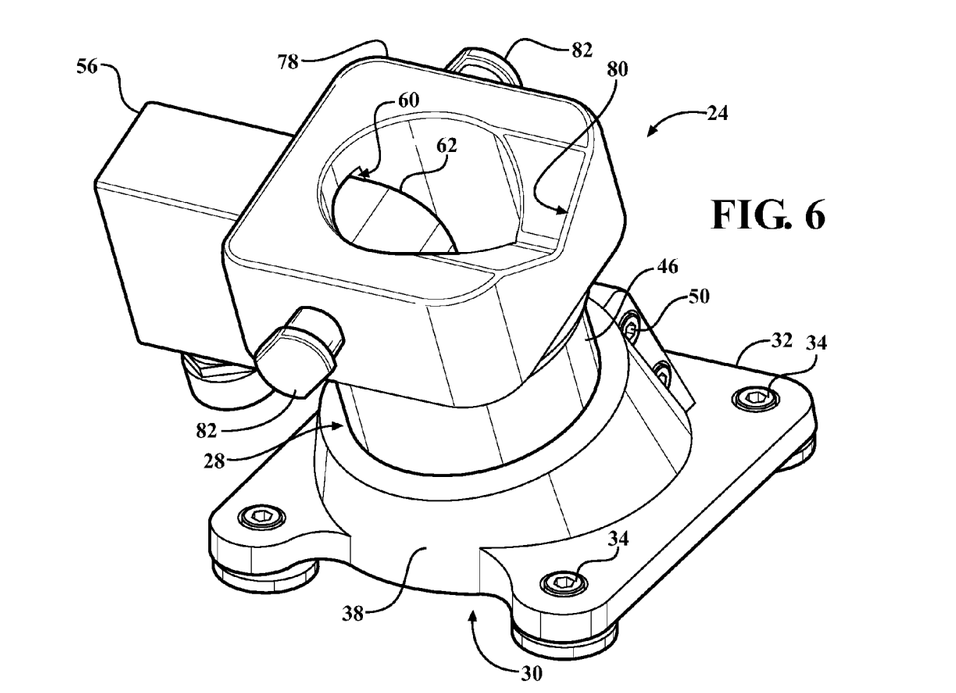
FIG. 6 is a perspective view of the holster showing a top of a sleeve having a bumper for supporting the nozzle.
Figure 7:
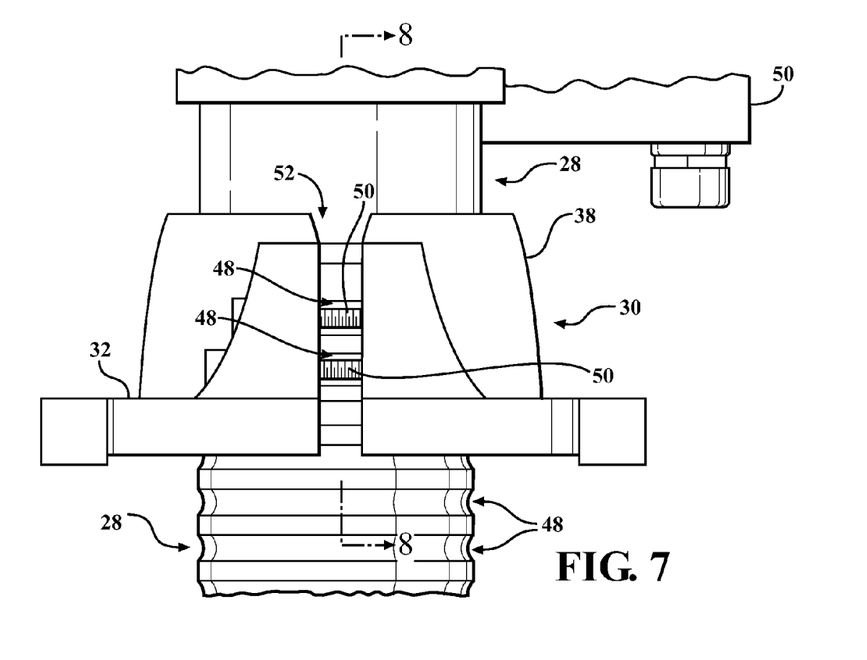
FIGS. 7 and 8 are side and cross-sectional views, respectively, of the bracket detailing cooperation between bolts and gaps in the main body of the holster.
Figure 8:
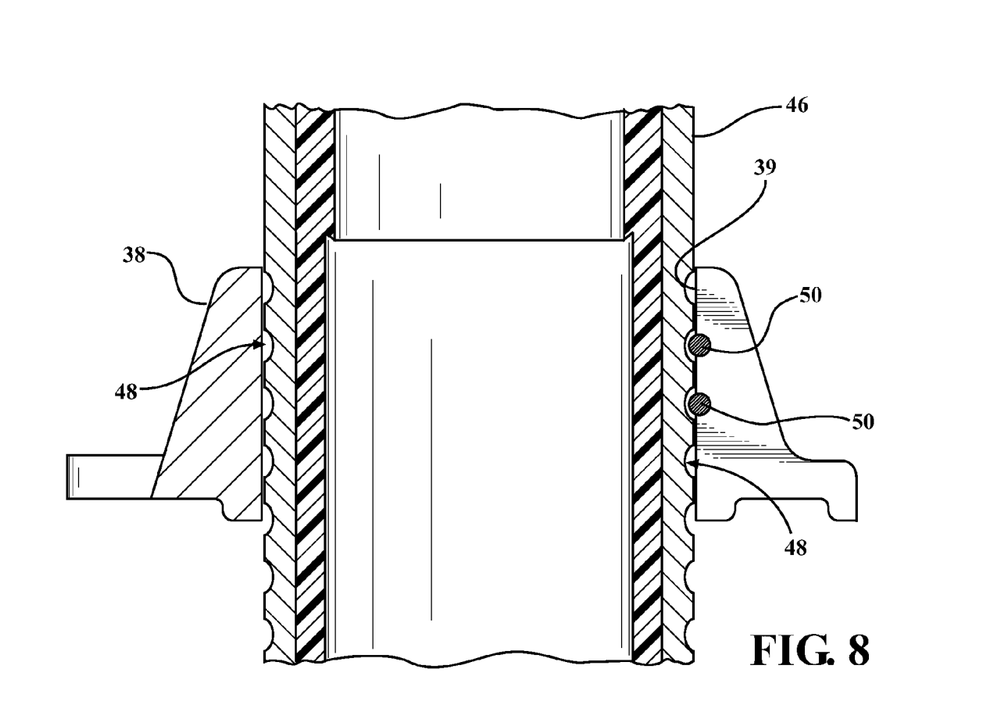
Figure 9:
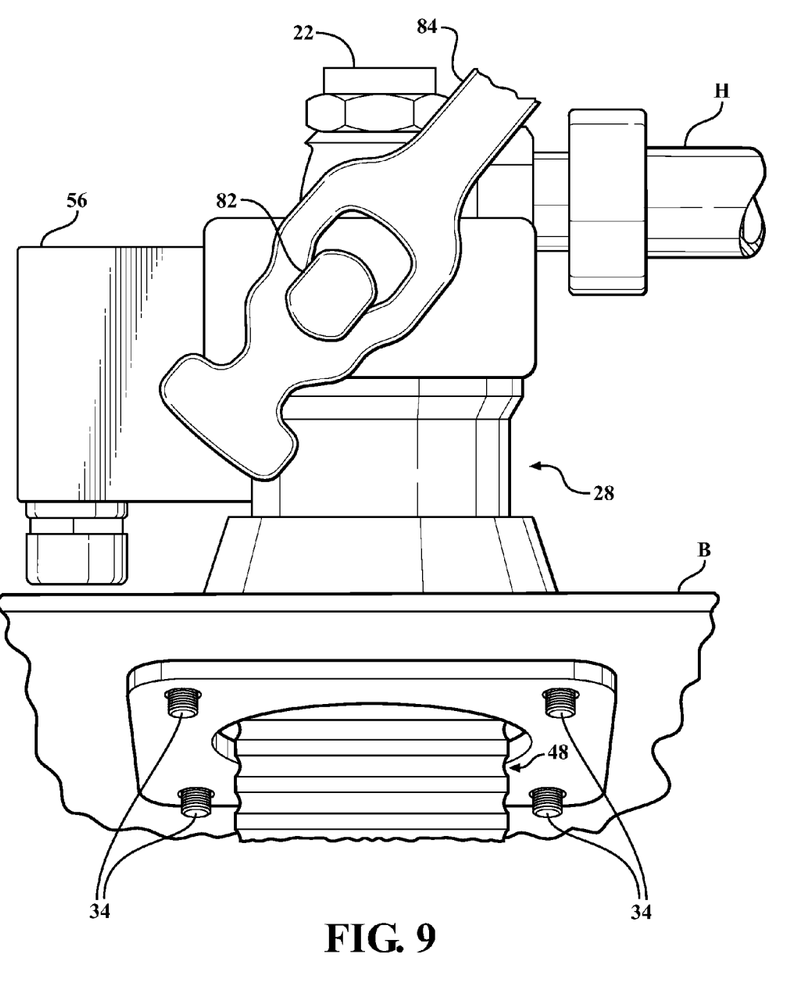
FIG. 9 is a partial side view of the holster.

Referring to FIG. 6, the sleeve 72 includes a bumper 78 disposed at the top 74. The bumper supports a portion (not numbered) of the nozzle 22 when the nozzle 22 is received in the holster 24. The bumper 78 has a general rectangular configuration and defines an indentation 80 complementary to a portion of the nozzle 22. This indentation 80 assists in preventing the nozzle 22 from rotating while stored in the holster 24. The bumper 78 also has a pair of studs 82 opposite each other and projecting generally outward. A strap 84, as best seen in FIGS. 2 and 3, cooperates with each of the studs 82 to secure the nozzle 22 to the bumper 78. Said differently, the strap 84 engages the nozzle 22 and each of the studs 82, as best seen in FIG. 9.

Referring again to FIG. 4, the bottom 76 of the sleeve 72 and the bottom end 42 of the main body 28 cooperate such that a diameter of the bottom 76 extends a predetermined distance beyond the bottom end 42 of the main body 28 for securing the sleeve 72 in the cavity 26 of the main body 28. The sleeve 72 defines one or more slots 88 each extending a predetermined distance above the bottom 86 to allow the sleeve 72 to be pinched when inserting the sleeve 72 into the main body 28. Referring to FIG. 4, the sleeve 72 of the illustrated embodiment defines four slots 88, each having an L-shape and being circumferentially and evenly spaced from each other. One advantage of the sleeve 72 defining one or more slots 88 is that a fluid may freely drain from the open cavity 26. However, it is to be appreciated that the sleeve 72 may be inserted into the main body 28 using other methods without departing from the nature of the present invention. Additionally, it is to be appreciated that the sleeve 72 and the strap 84 each may comprise a material such as, but not limited to, a polymer such as an elastomer, a thermoplastic, and blends thereof. Preferably, the sleeve 72 and strap 84 each comprises an elastomer for protecting the nozzle 22 from mechanical wear.

In an alternative embodiment, an enclosure (not shown) may be disposed around at least part of the holster 24 to enclose and thereby protect the holster 24, and the nozzle 22, from the elements. The enclosure includes a door (not shown) which is openable to provide access to the holster 24 and the nozzle 22. A door sensor (not shown) senses whether the door is open or not. In one implementation, the door sensor is in communication with the drive element E of the vehicle to disable the drive element E of the vehicle V, in conjunction with the sensor 54 and switch 66. That is, the drive element E is disabled when either the nozzle 22 is not disposed within the holster 24 or when the door is open. In another implementation, the door sensor is utilized instead of the sensor 54 such that the drive element E is disabled when the door is open.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A system for disabling a vehicle carrying a storage tank for holding a substance, said system comprising:
 a nozzle connectable to a hose in fluidic communication with the storage tank;
 a holster defining a cavity for receiving said nozzle when not in use;
 said holster including a main body and a bracket;
 said bracket affixable to the vehicle and engagable with said main body at a plurality of positions along said main body; and
 a sensor for sensing whether said nozzle is received in said holster and in communication with at least one drive element of the vehicle to disable the at least one drive element when said nozzle is not received within said holster.

2. A system as set forth in claim 1 wherein said main body extends between a top end and a bottom end and has an inner surface and an outer surface.

3. A system as set forth in claim 2 wherein said outer surface of said main body defines a plurality of recesses spaced from one another.

4. A system as set forth in claim 3 wherein said bracket has an engagement portion with an interior surface for engaging with said main body.

5. A system as set forth in claim 4 wherein said bracket defines a hole passing through said interior surface for accommodating a bolt.

6. A system as set forth in claim 5 wherein said bolt cooperates with at least one of said recesses of said outer surface of said main body for securing said main body to said bracket at one of said plurality of positions.

7. A system as set forth in claim 2 wherein said main body defines an opening through said inner and outer surfaces.

8. A system as set forth in claim 7 further comprising a sensor housing having an inner chamber and disposed adjacent said outer surface of said main body to at least partially enclose said opening of said main body.

9. A system as set forth in claim 8 wherein said sensor is disposed within said inner chamber of said sensor housing.

10. A system as set forth in claim 9 further comprising a sensor block operatively connected to said sensor housing and movable between a first position wherein said sensor block is disposed substantially within said cavity of said holster and a second position wherein said sensor block is disposed substantially within said inner chamber of said sensor housing such that said sensor senses the position of said sensor block when in said second position.

11. A system as set forth in claim 1 further comprising a switch in communication with said sensor and connectable to the at least one drive element of the vehicle to disable the at least one drive element when said nozzle is not received within said holster.

12. A system as set forth in claim 1 further comprising a sleeve disposed with said cavity of said holster for preventing said nozzle from directly contacting said holster.

13. A system as set forth in claim 12 wherein said sleeve extends between a first end and a second end and defines a cavity for accommodating said nozzle.

14. A system as set forth in claim 13 wherein said sleeve includes a bumper disposed at said first end for supporting a portion of said nozzle when said nozzle is received in said holster.

15. A system for disabling a vehicle carrying a storage tank for holding a substance and having a nozzle in fluidic communication with the storage tank, said system comprising:

a holster defining a cavity for receiving the nozzle when not in use;

said holster including a main body and a bracket;

said bracket affixable to the vehicle and engagable with said main body at a plurality of positions along said main body; and a sensor for sensing whether the nozzle is received in said holster and in communication with at least one drive element of the vehicle to disable the at least one drive element when the nozzle is not received within said holster.

16. A system as set forth in claim 1 further comprising a sleeve disposed with said cavity of said holster for preventing said nozzle from directly contacting said holster.

17. A system for disabling a vehicle carrying a storage tank for holding a substance and having a nozzle in fluidic communication with the storage tank, said system comprising:

a holster having a main body with an outer surface and an inner surface defining a cavity for receiving the nozzle when not in use;

an opening defined in said main body;

a sensor disposed outside of said cavity and in communication with at least one drive element of the vehicle to enable or disable the at least one drive element; and a sensor block movable between a first position where said sensor block is disposed substantially within said cavity of said holster in response to the nozzle being absent from said cavity and a second position wherein said sensor block is disposed substantially outside of said cavity such that said sensor senses the position of said sensor block in response to the nozzle being received in said cavity.

18. A system as set forth in claim 17 further comprising a sensor housing having an inner chamber and disposed adjacent said outer surface of said main body to at least partially enclose said opening of said main body.

19. A system as set forth in claim 18 wherein said sensor is disposed within said inner chamber of said sensor housing and said sensor block is disposed substantially within said inner chamber of said sensor housing when in said second position.

20. A system as set forth in claim 19 wherein said sensor block is formed of a non-conductive material and encapsulates a conductive insert formed of a conductive material.

* * * * *

UNITED STATES PATENT AND TRADEMARK OFFICE
CERTIFICATE OF CORRECTION

| | | |
|---|---|---|
| PATENT NO. | : 8,132,639 B2 | Page 1 of 1 |
| APPLICATION NO. | : 12/752662 | |
| DATED | : March 13, 2012 | |
| INVENTOR(S) | : James C. Zuck et al. | |

It is certified that error appears in the above-identified patent and that said Letters Patent is hereby corrected as shown below:

Column/Line    Error Reads:
8/12    A system as set forth in claim 1 further comprising Should read:
A system as set forth in claim 15 further comprising Signed and Sealed this
First Day of May, 2012

David J. Kappos
*Director of the United States Patent and Trademark Office*